Patented Feb. 17, 1953

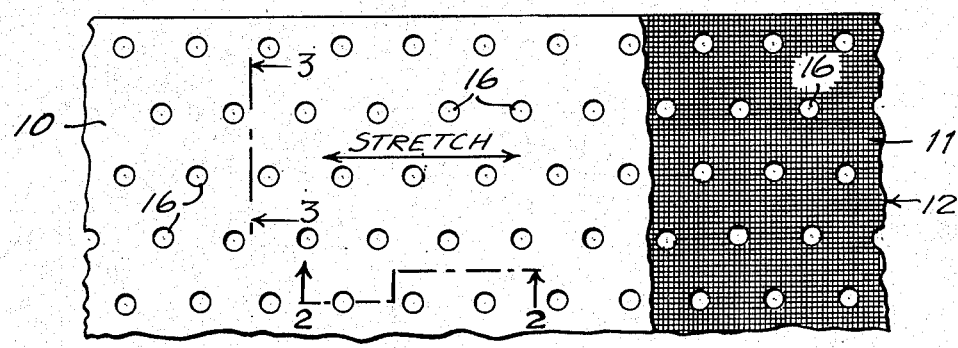
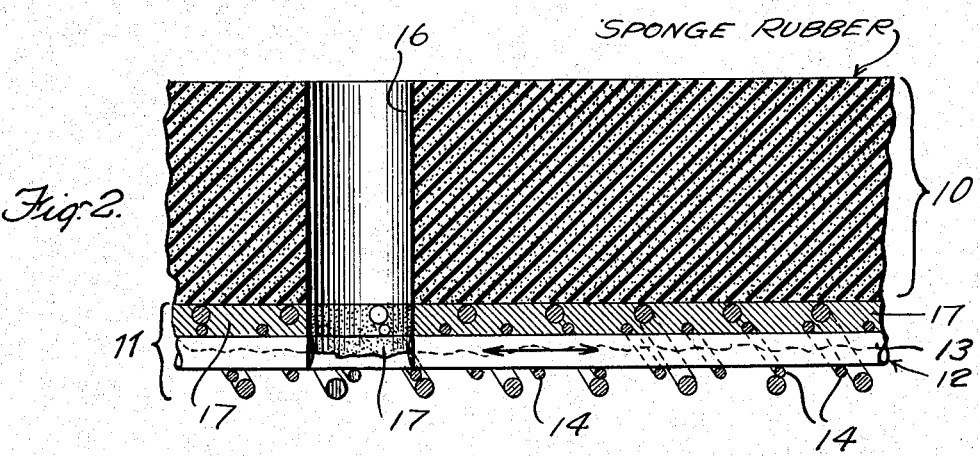
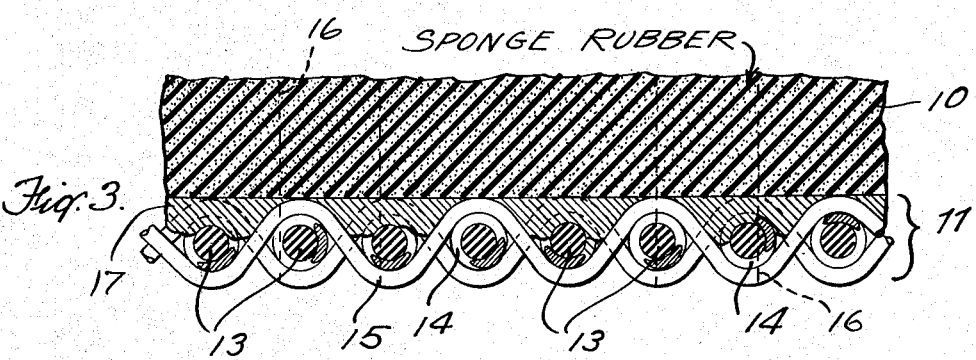
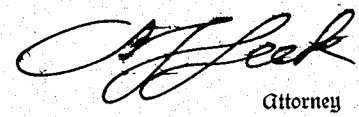

2,628,928

UNITED STATES PATENT OFFICE 2,628,928

ELASTIC FABRIC

Esther Cadous, New York, N. Y.

Application June 8, 1951, Serial No. 230,653

1 Claim. (Cl. 154—48)

This invention relates to stretchable fabrics for garments or parts thereof, and more particularly to a fabric having a sponge rubber facing and a stretchable backing.

An object of the invention is to provide a fabric of the above type having novel and improved characteristics.

Another object is to provide a laminated fabric of the above type having a backing of knitted or woven one-way stretch material.

Another object is to provide a fabric of the above type woven with wound rubber strands in which the rubber strands of the backing are bonded to the sponge rubber facing.

Other objects and advantages will be apparent as the nature of the invention is more fully disclosed.

The novel features which are characteristic of this invention will be better understood from the following description, taken in connection with the accompanying drawing in which a specific embodiment has been set forth for purposes of illustration.

In the drawing:

Fig. 1 is a broken front elevation of a strip of fabric embodying the invention;

Fig. 2 is a section on an enlarged scale taken on the line 2—2 of Fig. 1; and

Fig. 3 is a section on an enlarged scale taken on the line 3—3 of Fig. 1.

Referring to the drawing the invention is illustrated as embodied in a laminated fabric comprising a facing 10 of sponge rubber which is cellular and pervious to air. Such material is readily stretchable, but has very low tensile strength. Hence a backing is necessary to provide the support and strength required for use in garments.

In the present embodiment the backing 11 comprises knitted or woven fabric having stretchable rubber yarn 12 extending in one direction. The yarn 12 comprises a rubber strand 13 usually covered by a wrapping 14 of cotton or the like which is wound thereon and is disposed to enable the strand to stretch a limited amount. In the embodiment shown the stretchable rubber yarns 12 extend lengthwise of the fabric and are woven with warp yarns 15.

The backing 11 is secured to the facing 10 by rubber cement 17 which is applied to the two layers in the form of a latex which permeates the wrapping 14 of the rubber strands 13 and bonds both the rubber strand and the sponge rubber facing to the wrapping. The wrapping is preferably wound loosely so as to allow the latex to penetrate between the turns of the wrapping and to bond the rubber strands directly to the sponge rubber at such points. In case of a knitted fabric the wrapping may be omitted and the rubber strands bonded directly to the sponge rubber.

The cement is applied by coating both surfaces with the latex, allowing the same to partially dry, superimposing the two materials with the coated surfaces in contact, squeezing or pressing the layers together, and curing to effect the bond.

The material thus described may be cut in strips and used in garments, for example, on the inside of undergarments with the sponge rubber in contact with the skin of the wearer. The rubber strands provide a uniform stretch and prevent the sponge rubber from tearing when under tension, particularly when the sponge rubber is sliced to a thickness of one centimeter or less.

The sponge rubber and the woven or knitted fabric provide a certain amount of breathing or ventilation due to the cellular structure of the sponge rubber and the open mesh of the superimposed fabric. To provide additional ventilation, the material may be pierced by a plurality of holes 16 extending entirely through both layers of the fabric. The holes 16 may be randomly disposed over the surface of the material and may be of various sizes.

It is noted that such holes interrupt certain of the rubber strands so that short, discontinuous strands remain in their original place between successive holes in a lengthwise direction. However, the rubber strands are anchored to the sponge rubber facing throughout their length. Hence the short strands are prevented from creeping when the fabric is stretched and thus maintain the necessary reinforcement for the sponge rubber. On the other hand if the rubber strands were not cemented to the sponge rubber as above described, the interrupted strands would creep through their covering and their elastic reinforcing effect on the sponge rubber would be lost. Hence the tensile strength would be reduced to that of the sponge rubber which in itself has insufficient strength for use as stretchable material. The elasticity and strength of the fabric is retained regardless of the arrangement of the holes.

What is claimed is:

A laminated stretchable fabric comprising a layer of cellular air pervious sponge rubber and a layer of woven stretchable fabric having rubber strands extending in one direction only, said rubber strands having a non-stretchable wrapping yarn loosely wound thereon and a rubber cement partially impregnating the loosely wound yarn and joining the rubber strands to said sponge rubber through said wrapping yarn and between the turns of said wrapping yarn, the fabric having a plurality of holes extending through both said layers and randomly disposed over the surface thereof, certain of said holes interrupting certain of said rubber strands, the cement retaining the interrupted strands in place so as to impart reinforcing characteristics to the fabric regardless of the interruption of said strands, said sponge rubber and said rubber strands being in normally unstretched condition whereby said wrapping yarn serves to limit the stretch of said fabric.

ESTHER CADOUS.

REFERENCES CITED

The following references are of record in the file of this patent:

UNITED STATES PATENTS

| Number | Name | Date |
| --- | --- | --- |
| 1,617,604 | Mills et al. | Feb. 15, 1927 |
| 2,196,492 | Clark et al. | Apr. 9, 1940 |
| 2,288,054 | Walton | June 30, 1942 |
| 2,332,848 | Grabec | Oct. 26, 1943 |